United States Patent [19]

Seki et al.

[11] 4,325,540
[45] Apr. 20, 1982

[54] APPARATUS FOR SUPPLYING FLUIDS TO A CONVERTER

[75] Inventors: Masahiko Seki; Yukito Io, both of Kitakyushu, Japan

[73] Assignee: Nippon Steel Corporation, Tokyo, Japan

[21] Appl. No.: 205,597

[22] Filed: Nov. 10, 1980

[30] Foreign Application Priority Data

Nov. 10, 1979 [JP] Japan .................. 54-144949

[51] Int. Cl.³ .............................................. C21C 5/42
[52] U.S. Cl. .................................... 266/243; 266/245
[58] Field of Search ........................... 75/59, 60; 266/243-247

[56] References Cited

U.S. PATENT DOCUMENTS

| | | | |
|---|---|---|---|
| 4,138,097 | 2/1979 | Farber | 266/245 |
| 4,195,985 | 4/1980 | Brotzmann | 75/60 |
| 4,198,230 | 5/1980 | Brotzmann | 75/60 |
| 4,280,838 | 7/1981 | Marukawa | 75/51 |

*Primary Examiner*—P. D. Rosenberg

*Attorney, Agent, or Firm*—Wenderoth, Lind & Ponack

[57] ABSTRACT

An apparatus for supplying fluids to a converter has a rotary joint coupled to a trunnion shaft, one end of the rotary joint being connected to fluid supply pipes and the other end to fluid conduits communicating with tuyeres at the bottom of the converter. The rotary joint comprises a fixed casing and a rotary assembly, that is sealedly and rotatably fitted in the casing and connected to the trunnion shaft. The rotary assembly has a cylindrical member fitting in the casing. A plurality of axially spaced, circular communication grooves are provided in at least one of the internal surface of the casing and the external surface of the cylindrical member. The cylindrical member is provided with a passageway which opens into the communication grooves at one end and into the atmosphere where the cylindrical member emerges outside the casing at the other. The fluid supply pipes are attached to the casing so as to communicate with the communication grooves and the fluid conduits to the exposed part of the cylindrical member so as to communicate with the passageway.

15 Claims, 23 Drawing Figures

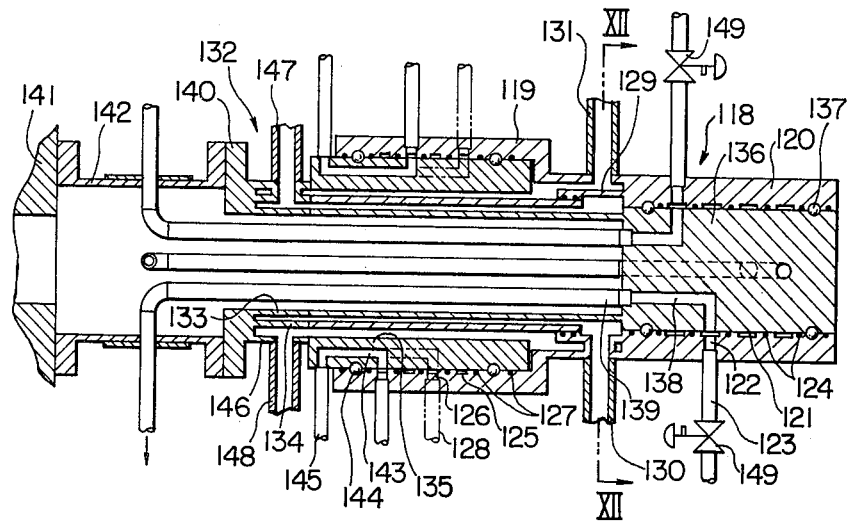
FIG. 11
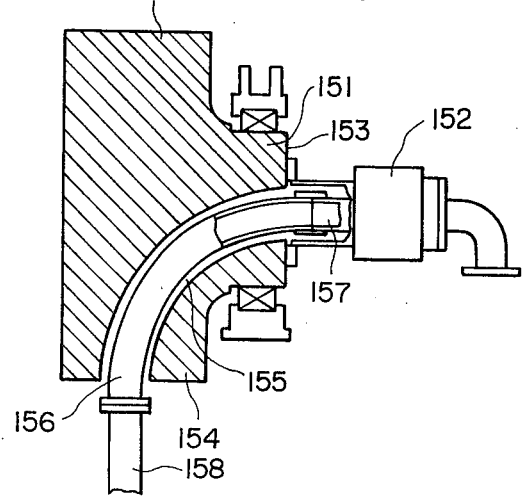
FIG. 13
FIG. 12

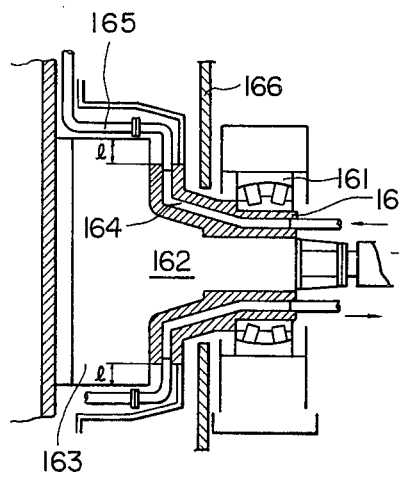
FIG. 14
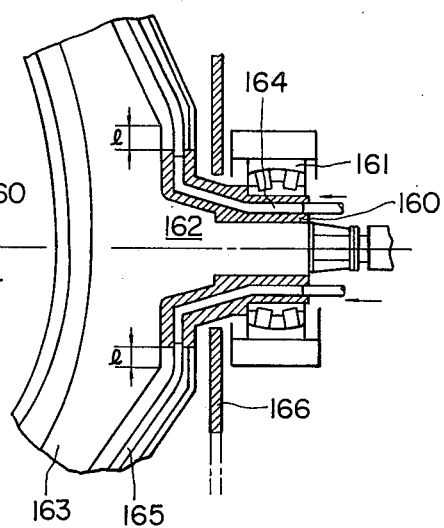
FIG. 15
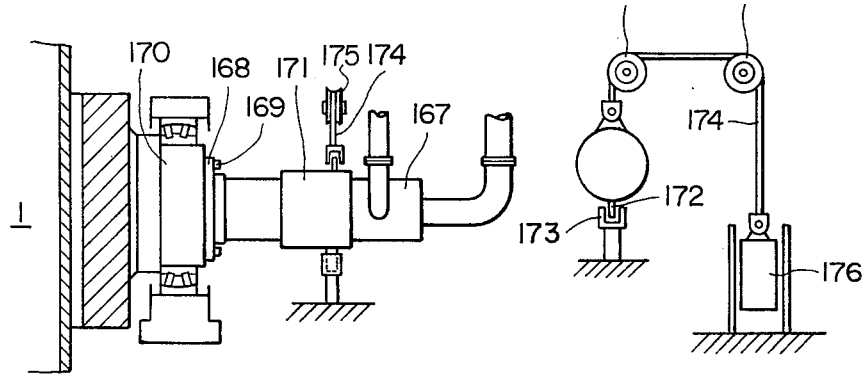
FIG. 16
FIG. 17

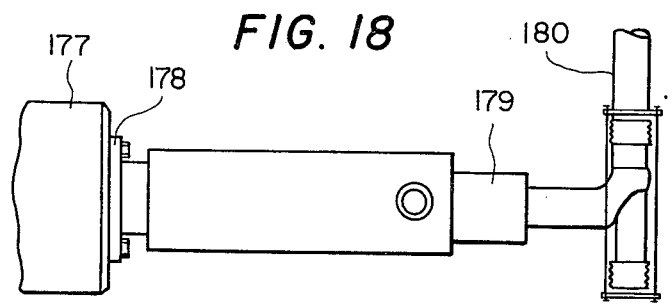
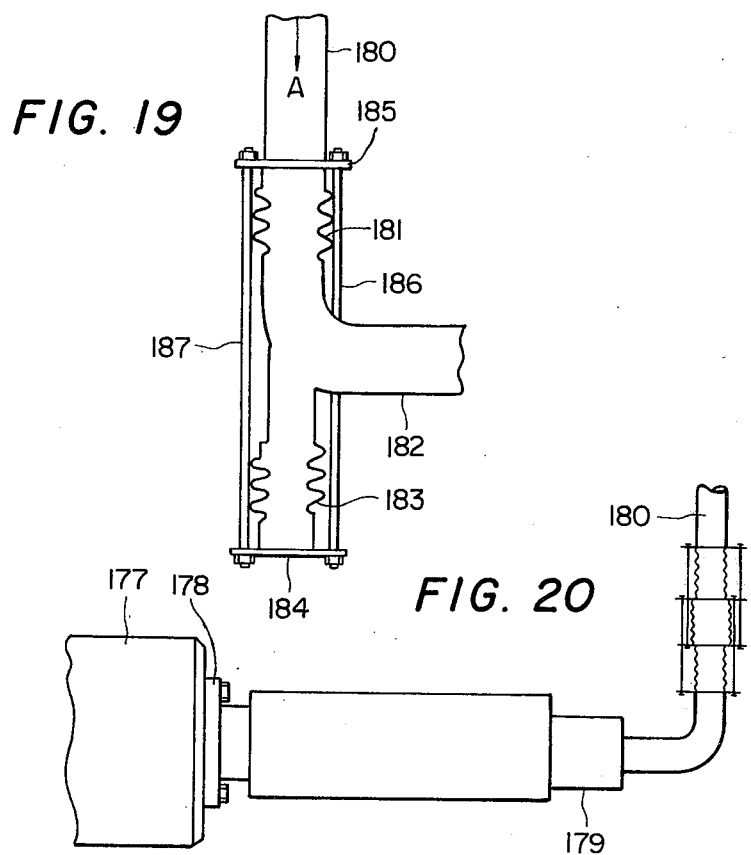

APPARATUS FOR SUPPLYING FLUIDS TO A CONVERTER

BACKGROUND OF THE INVENTION

This invention relates to apparatus for supplying a plurality of different fluids, independently and simultaneously, to a bottom-blown or a top-and-bottom blown converter through a metal-refining gas injecting nozzle and an annular nozzle positioned therearound so as to inject cooling fluids to project the refining gas injecting nozzle, both nozzles being provided in the converter bottom.

Generally an, apparatus for supplying oxygen, hydrocarbon gas, nitrogen gas, cooling water and the like independently and simultaneously to a bottom- or top-blown converter includes a rotary joint coupled to the shaft of a trunnion ring supporting the converter. The rotary joint has a plurality of fluid passageways on the inside, thereof which lead to an injection nozzle or a converter cooling device by way of passageways in the trunnion shaft or pipes extending through sleeves fitted in the trunnion shaft.

Conventionally, a rotary joint for the top- and bottom-blown converters has been a simple assembly made up of a plurality of coaxially disposed pipes. As the number of injecting fluids increase, the number of coaxial pipes is increased accordingly. Usually about four pipes or so having different diameters, are coaxially extended. The difficulty of this arrangement is related to the need to keep the pipes of different diameters positioned around the same axis.

The conventional bottom-blown converters include two pipes, having different diameters, which are concentrically arranged inside the rotary joint to provide separate passageways for the refining oxygen and protective gas, and the pipings leading from the trunnion ring to the bottom are bifurcated so as to supply the fluids to the individual nozzles. With this design, in the event that a particular nozzle suffers extraordinarily rapid erosion, the flow rates and therefore the ratio of the oxygen to protective gas supplied to the nozzle in question cannot be controlled independently. Therefore, erosion of a single nozzle endangers the life of the entire bottom of the converter. Even if the bricks positioned around other tuyeres are still usable, the entire bottom must be replaced, causing a great economic loss.

If the supply of protective gas to an extraordinarily eroded nozzle is increased so as to provide more cooling, molten metal adheres to the exit end of the tuyers, thereby protecting the brick near the tuyers and lowering the wearing rate of the damaged nozzle. By this means, all tuyeres are allowed to wear uniformly. On the other hand, tuyere clogging is likely to occur, but this trouble can be eliminated by reducing the supply of protective gas and, thereby, melting away the excess metal or refractory material. To achieve this type of control, a flow-rate control valve must be provided in a protective gas conduit leading to each individual nozzle. However, flow-rate control valves cannot be provided close to the converter shell because of high temperatures associated therewith. Even if the valves were installed, they might possibly be damaged by the falling material. More over, it is very difficult to provide effective thermal protection to the electrical wiring etc. required for the valve operation. Accordingly, the flow-rate control valves must be positioned at a considerable distance away from the converter.

Another method commonly employed plugs the extraordinarily worn-down nozzle with metal or refractory material. But this method , of course, has its limit, because satisfactory refining cannot be accomplished when too many tuyeres are plugged. At any rate, even if this method is utilized an early bottom change is inevitable.

SUMMARY OF THE INVENTION

The present invention functions to effectively eliminate the aforementioned problems and therefore has various advantages when compared to the fluids supply apparatus of the prior art for converters. An object of the present invention is to provide an apparatus for supplying many kinds of fluids to converters that is easy to manufacture.

Another object of the present invention is to provide an apparatus for supplying fluids to a converter that is capable of independently controlling the flow rates of each of the fluids.

An apparatus for supplying fluids to a converter according to the present invention has a rotary joint coupled to a trunnion shaft, one end of the rotary joint being connected to fluid supply pipes and the other end to fluid conduits communicating with tuyers located at the bottom of the converter or vessel. The rotary joint comprises a fixed casing and a rotary assembly that is sealedly and rotatably fitted in the casing and connected to the trunnion shaft. The rotary assembly has a cylindrical member fitted within in the casing. A plurality of axially spaced, circular communication grooves are provided in the inner peripheral surface of the casing adjacent the outer peripheral surface of the cylindrical member. The cylindrical member is provided with passageways which open into a respective communication groove at each passageway one end and each passageway other end communicates with a conduit attached to the cylindrical member where it emerges from the casing. Fluid supply pipes are attached to the casing so as to communicate with a respective communication thereby respectively communicating each to the supply pipe with a conduit via a respective communication groove and passageway.

The apparatus according to the present invention is easy to manufacture because the rotary joint thereof does not comprise a plurality of pipes and cylinders superimposed one over another. Additionally, this feature allows the connecting of many supply pipes and conduits to the rotary joint. Accordingly, gases and fluids can be supplied independently to each tuyere. Also, flow-rate values are provided upstream of the rotary joint so as to regulate the fluid injection flow rate for each tuyere. This, in turn, permits independent control of the cooling of each tuyere, thereby preventing the extraordinary erosion of the tuyeres and surrounding brick and, consequently, lengthening the vessel life remarkably.

BRIEF DESCRIPTION OF THE DRAWINGS

FIG. 11 is a cross-sectional view showing a further embodiment of the rotary joint.

FIG. 12 is a cross-sectional view taken along the line XII—XII of FIG. 11;

FIG. 13 is a partially cross-sectional view showing an embodiment of a fluid pipe passing through a trunnion ring and shaft according to the present invention;

FIGS. 14 and 15 show an embodiment according to the present invention wherein a sleeve is fitted over a trunnion ring and shaft; FIG. 14 shows a longitudinal cross section of the sleeve, and FIG. 15 a transverse cross section thereof;

FIG. 16 is a side view of an embodiment according to the present invention showing a rotary joint support;

FIG. 17 is a front view of the support shown in FIG. 16;

FIG. 18 shows a device according to the present invention which reduces the effect of the forces of fluids exerted on the fluid supply pipes connected to the rotary joint;

FIG. 19 is an enlarged detailed view of the fluid force effect reducing device shown in FIG. 18;

FIG. 20 shows another embodiment of a fluid force effect reducing device according to the present invention which is connected to a fluid supply pipe;

DETAILED DESCRIPTION OF THE PREFERRED EMBODIMENTS

To facilitate the understanding of the novel characteristics and favorable results obtained by the present invention, a conventional apparatus for supplying fluids to converters will be described first.

Figure 1:
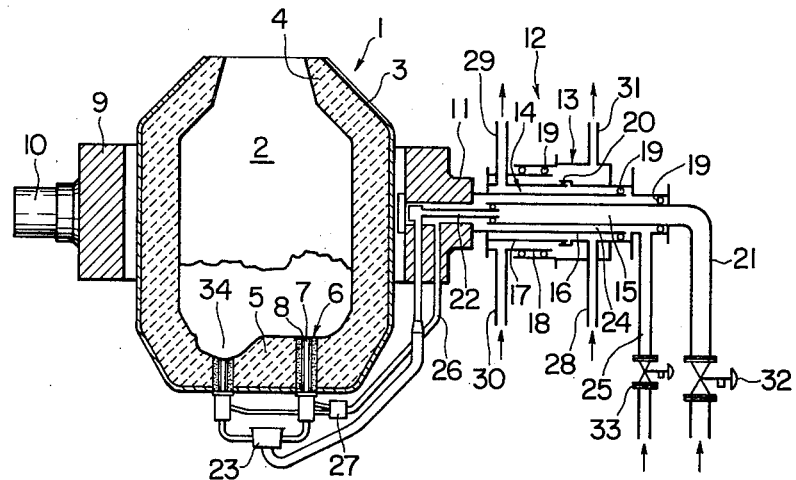
FIG. 1 is a cross-sectional view of a converter and a conventional fluids according to the prior art supply apparatus.

FIG. 1 shows a top-and-bottom blown converter and an accompanying fluids supply apparatus according to the prior art.

A vessel 2 of a top-and-bottom blown converter 1 comprises a steel shell 3 and a refractory lining 4 provided on the inside thereof. The bottom 5 is provided with at least two tuyeres 6, each tuyere 6 having a nozzle 7 for injecting metal-refining oxygen and an annular nozzle 8, surrounding said nozzle 7, for injecting a vessel-protecting gas (such as propane gas).

The vessel 2 is supported by a trunnion ring 9 which rests on horizontally extending trunnion shafts 10 and 11. The trunnion shafts 10 and 11 are supported by bearings (not shown). One trunnion shaft 10 is coupled to a driving system (not shown) comprising a motor, gear transmission, etc., which tilts the vessel 2 by way of the trunnion ring 9. The other trunnion shaft 11 is linked to a rotary joint 12 which supplies oxygen and other fluids to said nozzles 7 and 8 and to a vessel cooling system (not shown).

The rotary joint 12 comprises a casing 13 and a rotary assembly 14 rotatably fitted therein. The rotary assembly 14 comprises an inner pipe 15, outer pipe 16, inner cylinder 17 and outer cylinder 18 which are disposed coaxially and isolated from one another. A bearing 19 and a sealing packing 20 are interposed between the casing 13 and rotary assembly 14 to facilitate the rotation of the rotary assembly 14 and prevent the leakage of the fluids between the casing 13 and rotary assembly 14.

Coupled to the trunnion shaft 11, the rotary assembly 14 rotates integrally with the trunnion ring 9 and, therefore, the vessel 2. The inner pipe 15 of the rotary assembly 14 communicates with an oxygen supply pipe 21, which is fixed to the casing 13, and with an oxygen pipe 22, which passes through the trunnion ring 9 and trunnion shaft 11. The oxygen pipe 22 connects with said oxygen injection nozzle 7 through a header 23. An annular space 24 located between the inner pipe 15 and outer pipe 16 communicates with a protective gas supply pipe 25 fastened to the casing 13. The near end with respect to the vessel 2 of the annular space 24 communicates with a protective gas pipe 26 which passes through the trunnion ring 9 and trunnion shaft 11. The protective gas pipe 26 leads to the protective gas injection nozzle 8 through a header 27.

A cooling water supply pipe 28, connected to the casing 13, communicates with an entry-side cooling water pipe 29 which is fastened to the inner cylinder 17 of the rotary assembly 14. The cooling water supplied from the supply pipe 28 returns to an exit-side cooling water pipe 30 which is fastened to the outer cylinder 18, after passing through the vessel cooling system (not shown). The returned cooling water is discharged through a cooling water discharge pipe 31, connected to the casing 13.

In the conventional fluids supply apparatus described above, oxygen and a protective gas, the quantities of which having been regulated by flow-rate control valves 32 and 33 respectively provided in the oxygen supply pipe 21 and in the protective gas supply pipe 25, are supplied to the injection nozzles 7 and 8 through the headers 23 and 27. Therefore, it is impossible to control the flow rates of the two gases independently at the individual nozzles, as previously discussed in connection with the background of the present invention. FIG. 1 shows a substantially worn-out part 34 of the bottom refractory near a tuyere 6, the wearing being due to the inability of independent flow rate control.

As stated before, the conventional rotary joint comprises the inner pipe 15, outer pipe 16, inner cylinder 17 and outer cylinder 18 which are concentrically arranged, one peripherally around another. Accordingly, an attempt to control the flow rates of fluids at the individual nozzles requires increasing the number of pipes and/or cylinders according to the number of nozzles. This naturally complicates the structure of the rotary joint and makes the manufacturing thereof very difficult.

Figure 2:
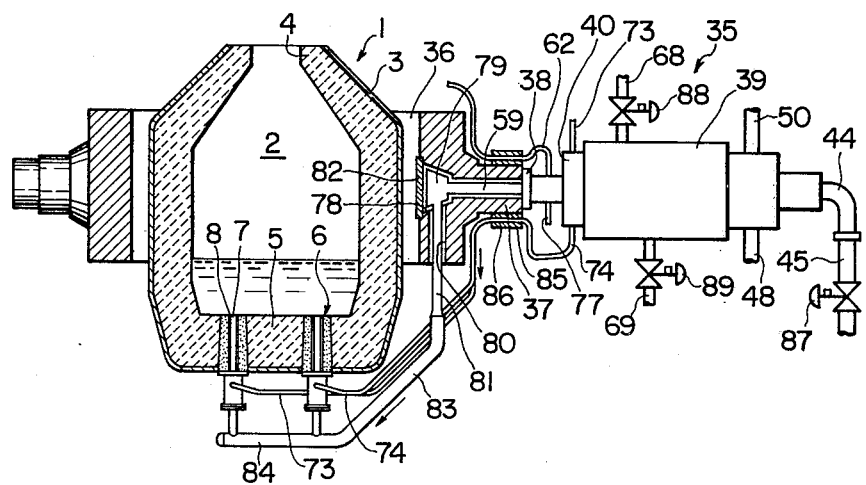
FIG. 2 is a cross-sectional view of a converter and a fluid supply apparatus of the first preferred embodiment according to the present invention.
Figure 3:
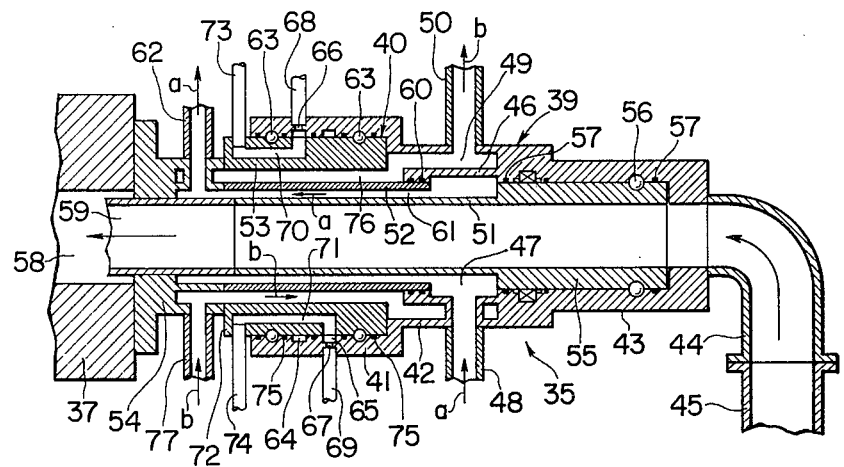
FIG. 3 is a cross-sectional view of a rotary joint of the apparatus shown in FIG. 2.
Figure 4:
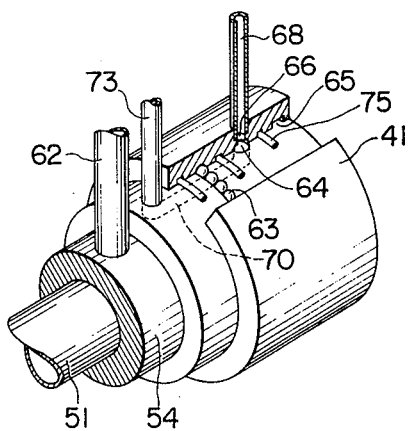
FIG. 4 is a partially cross-sectional perspective view showing part of the rotary joint shown in FIG. 2.

FIGS. 2, 3 and 4 show a first embodiment of this invention. Since the vessel in FIG. 2 is similar to the above-described conventional one, the same reference numerals as used in FIG. 1 are employed for designation.

As evident from FIGS. 3 and 4, a fluids supply apparatus according to the present invention has a rotary joint 35 whose structure is substantially different from that of the conventional one. As shown in FIG. 2, the rotary joint 35 is fastened, by means of a flange 38, to one end surface of a non-driven trunnion shaft 37 projecting outwardly from a trunnion ring 36. The rotary joint 35 consists a casing 39 and a rotary assembly 40.

As shown in FIG. 3, the casing 39 comprises three cylindrical members 41, 42 and 43 which are assembled systematically, with an elbow 44 fastened to the far end thereof with respect to the vessel (at the right of the figure). The elbow 44 is coupled to an oxygen supply pipe 45. The casing 39 is open at the near end, with respect to the vessel, in which the rotary assembly 40 is fitted. The middle cylindrical member 42 of the casing 39 has on one inner radial surface a cylindrical projection 46 that coaxially extends toward the near end with respect to the vessel (at the left of the figure). The middle cylindrical member 42 is connected to a cooling water supply pipe 48 communicating with an annular space 47, which is defined by the space between the inner periphery of the projection 46 and the outer periphery of an inner pipe 51 and a cooling water discharge pipe 50 communicating with an annular space 49 which is defined by the space between the outer periphery of the projection 46 and the outer peripheral wall of the cylindrical member 42, the two pipes 48 and 50 being circumferentially spaced from each other.

The rotary assembly 40 has an inner pipe 51, outer pipe 52 and outer cylinder 53, the outer pipe 52 and outer cylinder 53 being coaxially connected to a body 54 at the near end.

The inner pipe 51 has a cylindrical-block-like sliding part 55 at the far end thereof, which is rotatably fitted radially inside the cylindrical members 42 and 43 of the casing 39. Between the cylindrical member 43 and the sliding part 55 is interposed a ball bearing 56, to facilitate the smooth rotation of the rotary assembly 40, and O-rings 57 to prevent the leakage of the fluid therefrom from the rotary assembly 40. The far end of the inner pipe 51 communicates with said elbow 44. The near end of the inner pipe 51 is connected to an intermediate pipe 59 which is inserted into a horizontal opening 58 provided in the trunnion ring 36 and trunnion shaft 37.

The near end of the cylindrical projection 46 of the casing 39 is rotatably fitted to. The far end of the outer pipe 52 O-rings 60 are provided where the outer pipe 52 is fitted to the projection 46 to prevent the leakage of fluid. An annular space 61, formed between the outer periphery of the inner pipe 51 and the inner periphery of the outer pipe 52, communicates with the annular space 47, and an entry-side cooling water pipe 62 is connected to the body 54 and communicates with the annular space 61. Therefore, the cooling water supplied by the cooling water supply pipe 48 flows through the annular spaces 47 and 61, by the arrow a, and then to the vessel cooling system (not shown) through the entry-side cooling water pipe 62.

The outer cylinder 53 of the rotary assembly 40 is rotatably fitted in the cylindrical member 41 at the near end of the casing 39, as shown in FIGS. 3 and 4. Ball bearings 63 are interposed between the outer periphery of the outer cylinder 53 and the inner periphery of the cylindrical member 41 to facilitate the rotation of the rotary assembly 40. Two circular communication grooves 64 and 65 are formed in the inner peripheral surface of the cylindrical member 41 in such a manner as to be axially spaced along the longitudinal axis thereof. The cylindrical member 41 of the casing 39 is provided with communication ports 66 and 67 which respectively communicate the communication grooves 64 and 65 with pipes 68 and 69. Protective gas supply pipes 68 and 69 are connected to the member 41 and respectively communicate with the communication ports 66 and 67. The outer cylinder 53 of the rotary assembly 40 is provided with conduction ports 70 and 71 which respectively communicate with the communication grooves 64 and 65. The conduction ports or passageways 70 and 71 open into the communication grooves 64 and 65 respectively, extend longitudinally along the longitudinal axis of the cylindrical member 41 and then radially outwardly extend along the radially projecting part 72. The conduction ports 70 and 71 are circularly spaced from each other, and protective gas pipes 73 and 74 are connected to the radially projecting part 72 and communicate with the exit end of the communication ports 70 and 71, respectively. Accordingly, the protective gas supplied by the protective gas supply pipes 68 and 69 flows to the protective gas conduits 73 and 74 by way of the communication ports 66 and 67, communication grooves 64 and 65, and conduction ports 70 and 71.

Sealing O-rings 75 are provided on both longitudinally sides of each of the communication grooves 64 and 65. The far end of an annular space 76, formed between the outer periphery of the outer pipe 52 and inner periphery of the outer cylinder 53, communicates with the annular space 49 formed by the inner periphery of the middle cylindrical member 42 of the casing 39 and the outer periphery of the projection 46.

The near end of the annular space 76 communicates with an exit-side cooling water pipe 77 fastened to the body 54 of the rotary assembly 40. The cooling water returned from the vessel cooling system (not shown) through the exit-side cooling water pipe 77 passes through the annular space 76 as indicated by the arrow b, and then discharges through the cooling water discharge pipe 50.

As shown in FIG. 2, an axially extending opening 58 communicates with a chamber 78 provided in the trunnion ring 36. The chamber 78 contains a manifold 79, and the near end of the middle pipe 59 passes through the far-end wall of the manifold 79 and is welded thereto. The trunnion ring 36 has a radially extending opening 80 extending downwardly from the chamber 78, with an intermediate pipe 81 passed through the opening 80. Passing through the bottom wall of the manifold 79, the upper end of the intermediate pipe 81 is welded to the manifold 79. After the welding, the manifold 79 is covered with a blind plate 82.

An oxygen pipe 83, connected to the lower end of the intermediate pipe 81, leads to a pipe 84 extending below the bottom 5. Oxygen is blown into the vessel through an oxygen injection nozzle 7 which is connected to the pipe 84. A sleeve 85 is fitted around the trunnion shaft 37. The sleeve 85 is provided with a plurality of axially extending openings 86 which are circularly spaced from each other. The protective gas pipes or conduits 73 and 74, and entry- and exit-side cooling water pipes 77 and 62 extend from the rotary assembly 40 and are fastened to the sleeve 85 so as to communicate with the horizontal openings 86. Extending beyond the sleeve 85 toward the bottom 5, the protective gas pipes 73 and 74 are connected to the annular protective gas injection nozzle 8.

As the trunnion ring 36 tilts, the rotary assembly 40 connected thereto rotates integrally with the trunnion ring 36, with respect to the casing 39. The rotation of the rotary assembly 40 does not effect the communication between the oxygen supply pipe 45 and oxygen pipe 83, the protective gas supply pipes 68 and 69 and protective gas supply conduits 73 and 74, the cooling water supply pipe 48 and entry- and exit-side cooling water pipes 62 and 77 or the cooling water pipe 77 and the cooling water discharge pipe 50.

In operating the converter of this type, a uniform quantity of oxygen, regulated by a flow-rate control valve 87, is supplied to each tuyere 6. The injection rate of the protective gas must be controlled for each tuyere 6 depending on the degree of erosion of the bottom 5. For this purpose, the protective gas supply pipes 68 and 69 connected to the rotary joint 35 of this invention respectively have flow-rate control valves 88 and 89 as shown in FIG. 2. This allows independent control of the protective gas injection rate for each individual tuyere 6, thereby preventing extraodinary wear of the vessel refractory.

Figure 5:
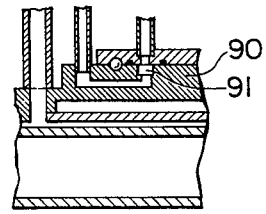
FIG. 5 is a cross-sectional view showing a modified form of a communication groove of the rotary joint shown in FIG. 3.

Instead of the communication grooves 64 and 65 provided in one cylindrical member of the casing 39, a communication groove 91 may be provided in the outer peripheral surface of an outer cylinder 90 of a rotary assembly, as shown in FIG. 5. Also, a communication groove may be provided in both the casing and outer cylinder.

Figure 6:
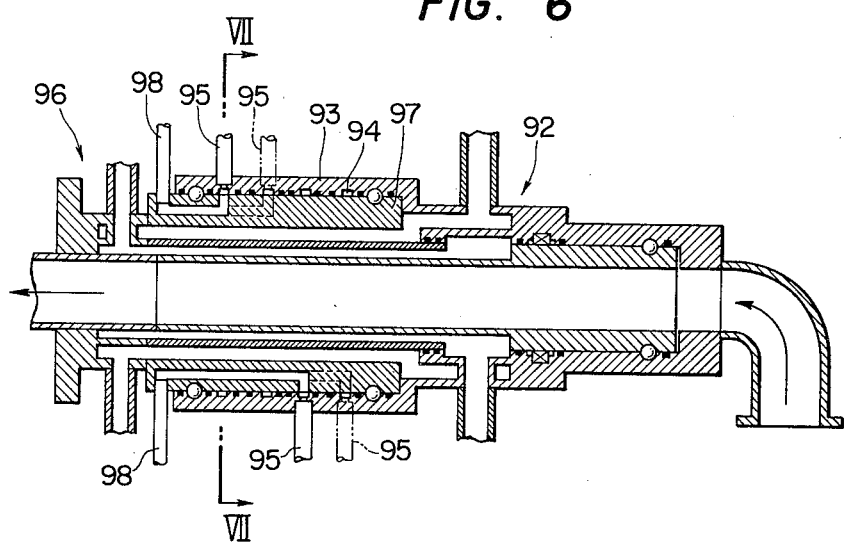
FIG. 6 is a cross-sectional view showing another embodiment of the rotary joint according to the present invention
Figure 7:
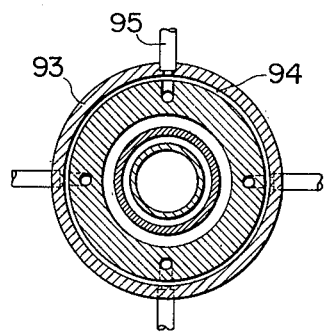
FIG. 7 is a cross-sectional view taken along the line VII—VII of FIG. 6.

FIGS. 6 and 7 show another embodiment according to the present invention. Instead of two protective gas pipes being connected to the rotary joint as in the above-described embodiment, four protective gas pipes are connected to the roary joint in this second embodiment, which is similar to the first embodiment in its other basic structural characteristics. Therefore, no description and like reference numerals are given to those parts in FIGS. 6 and 7 which respectively correspond to like parts in FIG. 3.

Four communication grooves 94 are provided in the inner peripheral wall of a cylindrical member 93 which is part of a casing 92, and the grooves 94 are axially spaced along the longitudinal axis of the cylindrical member 93. Four protective gas supply pipes 95, respectively communicating with the individual grooves 94, are fastened to the cylindrical member 93. Four protective gas pipes or conduits 98, respectively communicating with the communication grooves 94, are connected to an outer cylinder 97 of a rotary assembly 96. Arranged as described above, this embodiment permits an independent supply of protective gas to each of four tuyeres. An increase in the number of the protective gas pipes and conduits can be accomplished by lengthening the cylindrical member 93 of the casing 92 and the outer cylinder 97 of the rotary assembly 96, thus resulting in a simple structure and which facilitates the manufacturing thereof.

Figure 9:
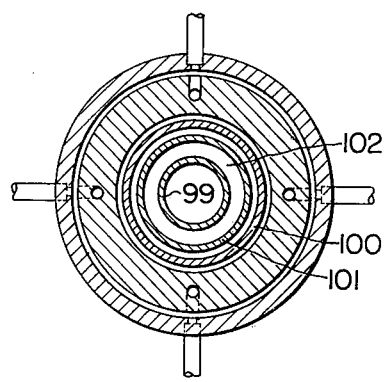
FIG. 9 is a cross-sectional view taken along the line IX—IX of FIG. 8.
Figure 8:
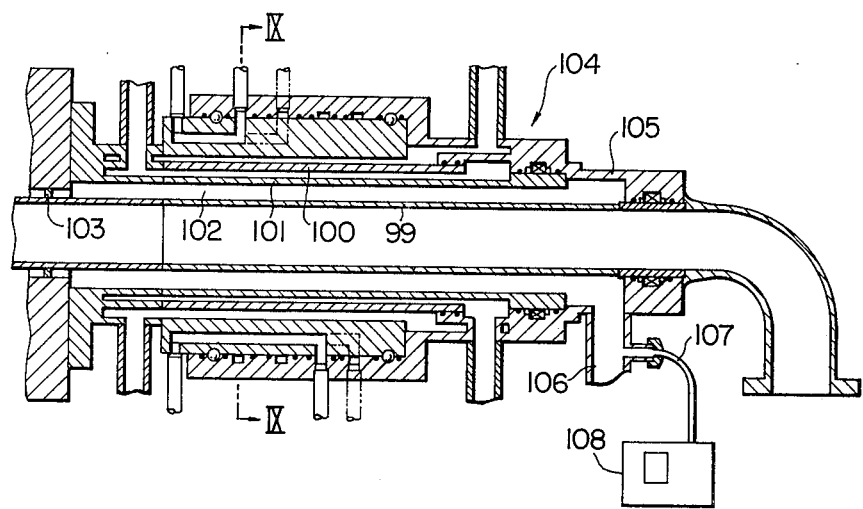
FIG. 8 is a cross-sectional view showing still another embodiment of the rotary joint according to the present invention.

FIGS. 8 and 9 show a third embodiment according to the present invention, which is similar to the second embodiment. Therefore, no description and reference numerals are given to the similar parts of the embodiments.

As shown in FIGS. 8 and 9, a middle pipe 101 is coaxially provided between an inner pipe 99 and an outer pipe 100. An annular space 102, formed by the space between the inner pipe 99 and middle pipe 101, is closed by a plate 103 provided at the near end, and the space 102 opens into a cylindrical member 105 of a casing 104 at the far end. To the cylindrical member 105 is connected a short pipe 106, which, in turn, is connected to a gas analyzer 108 by way of a conduit 107. Having a build-in pump (not shown), the gas analyzer invariably sucks, and analyzes, the gas from the annular space 102. When detecting a leakage of oxygen from the inner pipe 99, the gas analyzer 108 gives an alarm to the operator, thus preventing the fire or explosion due to an oxygen leak. A non-explosive gas, such as an inert gas, may be passed through said annular space 102. Also, the plate 103 may be removed to communicate the annular space 102 with the atmosphere. Furthermore, the gas analyzer 108 may be eliminated, whereupon the annular space 102 may serve as a buffer space.

Figure 10:
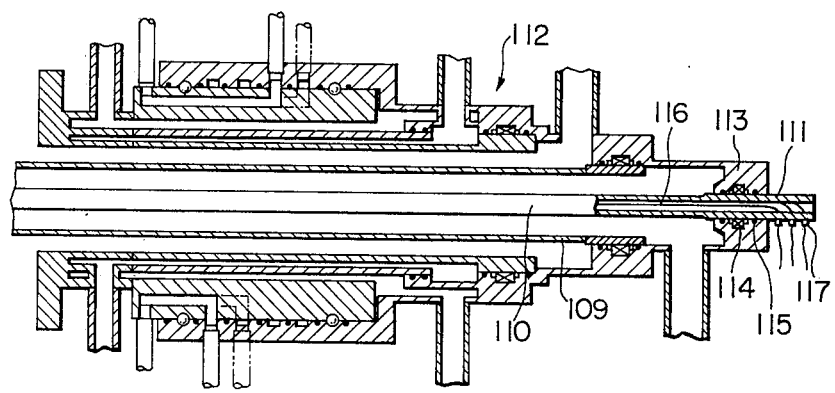
FIG. 10 is a cross-sectional view showing yet another embodiment of the rotary joint according to the present invention.

FIG. 10 shows a fourth embodiment according to the present invention, which is a modification of the third embodiment. Accordingly, no description is given as to the parts that are similar to those previously described in the foregoing embodiments.

In this embodiment, a conduit 110 is coaxially provided inside an inner pipe 109. The far end 111 of the conduit 110 passes through a cylindrical member 113 comprising the end of a casing 112, and a ball bearing 114 and a sealing O-ring 115 is provided between the member 113 and the end 111. Therefore, the conduit 110 can sealingly rotate integrally with the inner pipe 109. An electric wire 116, which supplies electric power to the auxiliary equipment of the converter or transmits signals from various sensors, is passed through the conduit 110. The electric wire 116 is connected to a power source or a signal processing unit (not shown) by way of an electrical joint 117, such as a ship ring, provided on the far end 111 of the conduit.

FIGS. 11 and 12 show a fifth embodiment according to the present invention, in which oxygen is supplied to the vessel bottom through a plurality of oxygen supply pipes, instead of the single inner pipe used in the foregoing embodiments.

As shown in FIGS. 11 and 12, a casing 118 comprises two cylindrical members 119 and 120 with different diameters joined together at an interface. Four circular, axially spaced communication grooves 121 are provided in the inner peripheral surface of the cylindrical member 120 at the far end. Corresponding to the communication grooves 121, four oxygen supply pipes 123, which respectively communicate therewith through respective communication ports 122, are attached to the cylindrical member 120. Sealing O-rings 124 are provided on both axial sides of each communication groove 121. Similarly, a communication groove 125, communication port 126, and sealing O-ring 127 are provided with respect to the cylindrical member 119 at the near end, to which a protective gas supply pipe 128 is connected. The cylindrical member 120 at the near end thereof is provided with a cylindrical projection 129 which is connected to a cooling water supply pipe 130 and a cooling water discharge pipe 131.

As with the first embodiment, a rotary assembly 132 comprises an inner pipe 133, outer pipe 134, and outer cylinder 135.

A sliding part 136, extending longitudinally or axially from the far end of the inner pipe 133, rotatably fits within the cylindrical member 120, and a ball bearing 137 is interposed therebetween. Four conduction ports or passageways 138 are provided in the sliding part 136, with one end of each port respectively communicating with one of the communication grooves 121. The conduction port 138 extends radially inward from the communication groove 121, bends 90 degrees, and longitudinally extends to the inner pipe 133. An oxygen pipe 139 is connected to the exit end of each conduction port 138. The pipe 139 axially extends through the inner pipe 133, and radially outwardly extends through a cylindrical intermediate piece 142, disposed between a flange 140 of the rotary assembly 132 and a radial end surface of a trunnion shaft 141, thereby emerging radially outside of the intermediate piece 142. The oxygen pipe 139 connects with an oxygen injection nozzle at the bottom of the vessel.

The sliding part 136 may be a hollow cylinder, instead of being a solid cylinder as in the above-described embodiment. If the port 136 is a hollow cylinder, the conduction port 138 is a radially extending hole, and the far end of the oxygen pipe 139 is connected to the inside of the sliding part 136 through an elbow.

As with the foregoing embodiments, the outer cylinder 135 of the rotary assembly 132 is provided with a conduction port 143, with a ball bearing 144 interposed between the outer periphery thereof and the inner periphery of the casing 118, and a protective gas pipe or conduit 145 is connected to the casing 118. To a coupling part 146 of the rotary assembly 132 are connected an entry-side cooling water pipe 147 and an exit-side cooling water pipe 148. Connected to the trunnion shaft 141 through said intermediate piece 142, the rotary assembly 132 rotates as the trunnion ring 141 tilts.

The rotary assembly 132 may be connected directly direct to the trunnion shaft 141 thereby eliminating the intermediate piece 142 which is interposed therebetween in the embodiment as shown in FIG. 11. Then, the coupling part 146 of the rotary assembly 132 is axially extended and structured so as to allow the oxygen pipe 139 to radially project therefrom.

In this embodiment, a flow-rate control valve 149 is respectively provided in each oxygen supply pipe 123 thereby permitting different flow rates of oxygen into the vessel via oxygen injection nozzles respectively associated with each supply pipe 123.

Usually in a bottom-blown converter, all metal-refining gas is injected through the tuyeres at the bottom. To supplying this large quantity of gas, many tuyeres (ranging from 12 to 30 in number) are used. To control the flow rate of the individual tuyeres, control valves and other intricate auxiliary equipment must be installed in the vicinity of the bottom of the vessel. From the viewpoint of manufacturing and maintenance, such an arrangement is practically impossible. By contrast, use of the rotary joint according to this invention simplifies the bottom structure and facilitates the gas control operation.

In the foregoing first to fifth embodiments, the rotary joint was coupled to the non-driven side trunnion shaft. Nevertheless, a according to the present invention may rotary joint be coupled to either a driven-side trunnion shaft or to trunnion shafts respectively located on both sides thereof. When the rotary joint has trunnion shafts connected to both sides thereof, the oxygen and cooling water supply pipes, for example, are connected to one shaft and the protective gas supply pipe are connected to the other.

Likewise, the inner pipe of the rotary joint need not always be utilized the refining gas alone; the protective gas or cooling water may be carried by the inner pipe, as well.

Other fluids than the protective gas may be passed through the conduction port, also.

FIG. 13 shows an embodiment, according to the present invention of the passageway in the trunnion ring and shaft through which oxygen or other fluid passes.

Through a trunnion ring 150 and trunnion shaft 151 is provided a conduction port 155 that extends from the end surface 153 of the trunnion shaft 151 facing a rotary joint 152, to the bottom surface 154 of the trunnion ring 150, thereby extending substantially along a quadrant. A curved conduit 156 is adapted to be passed through the conduction port or passageway 155. The conduit 156 is connected to an inner pipe 157 of the rotary joint 152 at its far end, and is connected to a gas pipe 158 carrying oxygen etc. at its near end.

In the above structure, the conduction part 155 may be used as a passageway thereby eliminating the conduit 156. In this case, the inner pipe 157 is connected, directly or through an intermediate pipe, to the end surface 153 of the trunnion shaft 151 so as to communicate with the conduction port 155, and the gas pipe 158 is connected to the bottom surface 154 of the trunnion ring 150. Or, the conduction port 155 may be extended to in the upper surface 159 of the trunnion ring 150.

When the passageway through the trunnion ring and shaft is thus formed, the following favorable results are obtainable:

(1) A curved fluid pipe can be passed through the short non-driven side trunnion shaft.

(2) The absence of additional joints facilitates manufacturing, assures easy disassembly when the curved pipe breaks and thereby eliminates the necessity for removing the steel shell or stopping the converter operation.

(3) With a bottom-blown or top-and-bottom blown converter introducing fluid as oxygen or oxygen plus powdered lime, it is a common practice to utilize a pipe having a radius of curvature not smaller than 3 times the diameter of the pipe so as to prevent the oxygen-induced combustion or explosion of the piping. From this perspective, the above-described improved structure insures a high degree of safety.

FIGS. 14 and 15 show an embodiment according to the present invention wherein a sleeve is mounted over the trunnion shaft.

According to a conventional arrangement there is provided on the inside of the bearing section supporting a trunnion ring, a conventional sleeve which is connected to the exit end thereof by welding, screwing in, or other method. In this area, a cover is provided to protect the piping from a large quantity of material comprising refractory or molten metal falling from the hood above the converter top. When a large amount of material falls thereon, the cover is deformed thereby damaging the piping. To repair or replace the damaged piping, the cover must be removed first, which, however, cannot be achieved until a large heat-insulating plate, protecting the bearing section, has been removed.

The aforementioned has resulted in a difficult maintenance operation.

In order to overcome the aforementioned disadvantages, the improved sleeve, according to the present invention has a funnel-like shape and extends far enough to cover a trunnion shaft joint.

As shown in FIGS. 14 and 15, a sleeve 160, shaped like a funnel, extends from inside a bearing 161 to the near side of a trunnion ring 163 thereby covering a trunnion shaft joint 162. A fluid passageway 164 is defined by the space between the inner periphery of the sleeve 160 and the outer periphery of the ring 163. The preferable distance 1 between the top and bottom surface of the trunnion ring, and/or the top and bottom end of the trunnion shaft joint, and the end of the end of the sleeve 160 is between 0 and 500 mm. Or, the sleeve end may slightly projects beyond the top and bottom and both sides of the trunnion ring.

Arranged as described above, the sleeve 160 facilitates the welding of vessel-side piping 165, thus increasing the reliability of the equipment. In the event that the piping or piping joint fractures, easy access thereto can be attained from above the trunnion ring without removing a heat-insulating plate 166. Thus this arrangement is conductive to a shortening of the downtime associated with a piping or piping joint fractures.

Metal-refining oxygen, cooling propane, natural gas, and kerosene are passed through the sleeve, and because a fracture of the piping and piping joint can possibly lead to explosion or to a counter flow and leakage of molten metal, the improved sleeve according to the present invention substantially eliminates such dangerous possibilities.

Since the rotary joint is a considerably large and heavy piece of equipment, and the forces of the fluids are exerted thereon, to support its own weight and to withstand the forces of the fluids, the rotary joint is held by a supporting device.

Generally, the rotary joint support must satisfy the following requisites:

(1) The fixed side or the casing of the rotary shaft must be held stationary so as not to rotate.

(2) After extended use, the trunnion shaft tends to tilt about the spherical bearing, as a result of which the rotary joint rotates eccentrically. Notwithstanding such eccentric rotation, the rotary joint must be capable of moving up and down, and back and forth without strain.

(3) The bending moment exerted on the flange section by the weight of the rotary joint and the effect of the forces of various fluids must be reduced to a minimum.

FIGS. 16 and 17 show an embodiment of a rotary joint support satisfying the above requisites according to the present invention.

The flange 168 of a rotary joint 167 is fastened to the end of a trunnion shaft 170 by bolts 169. An anti-rotation pin 172 projecting from the bottom of the fixed part or casing 171 of the rotary joint 167 fits somewhat loosely in an anti-rotation pin support 173, leaving an adequate clearance therebetween. The fixed part 171 is suspended by a rope 174 attached to the top thereof. The rope 174 is attached to a weight 176 and is operatively associated with pulleys 175. The weight 176 is supported by suitable means so as not to swing back and forth.

By using a weight that is equal to or lighter than the rotary joint, the bending moment due to the weight of the rotary joint can be substantially eliminated. Suspended by the rope, the rotary joint can move freely as the weight moves up and down. In addition, this simple structure is relatively trouble free and is economical to manufactured and to install.

With the arrangement as described above the maximum bending moment acting on the flange of the rotary joint is due to the forces of the oxygen, compressed air, etc. passed through the passgeways of the rotary joint. Since the rotary joint, as stated before, rotates eccentrically as the trunnion shaft includes due to the tilting of the converter, the fluid supply pipes are joined together by expansion pipes, flexible hoses, or the like.

When highly pressurized fluids are supplied, these expansion pipes and flexible hoses are subjected to great forces. A, small-diameter flexible hose, up to approximately 80 mm in diameter, can be readily bent with only a small force exerted thereon. When the diameter exceeds 80 mm, the hose becomes too rigid to be bent easily. Thus in order to bend larger-diameter hoses with a small force, the length must be increased. Therefore, the use of large-diameter flexible hoses is practically difficult.

An expansion pipe is subjected to large forces, which develops a great bending moment at the flange of the rotary joint. If the pipe diameter is 200 mm and the fluid pressure is 10 kg/cm$^2$, the resulting reaction force can be derived from $p = P \times A$ (where A = the cross-sectional area of the pipe = 329 cm$^2$). Hence, $p = 10 \times 329 = 3290$ (kg).

This large force often breaks the flange of the rotary joint. The force is particularly great when utilizing a bottom-blown or top-and-bottom blown converter in which the oxygen pressure reaches between 5 and 10 kg/cm$^2$ and the pipe diameter ranges from 150 to 300 mm.

FIGS. 18 through 22 show a device which reduces the effect of the forces of fluids, by providing a pressure of force balancing expansion section in the flexible fluid supply pipe.

FIG. 18 is an overall view, and FIG. 19 a partially enlarged view, of a fluid force effect reducing device. Reference numeral 177 designates a trunnion shaft, 178 the flange of a rotary joint, and 179 the rotary joint. A supply pipe 180 is in the curved vicinity of the passageway adjacent the rotary joint 179, and a supply pipe 180 is coupled thereto. An enlarged view of the device is shown in FIG. 19. The supply pipe 180 communicates with to a supply pipe 182 through a first flexible pipe 181. A second flexible pipe 183 communicates with the supply pipe 182, and is curved so as to reach the supply pipe 182. The lower end of the flexible pipe 183 is covered with a blind flange 184, and the flange 184 is connected to a flange 185 situated on the first flexible pipe 181, by means of threaded connecting rods 186 and 187 fastened by nuts (the flange 184 may be directly connected to the supply pipe 180).

With this structure as described above, a high-pressure fluid flowing in the direction of the arrow A exerts pressure on the blind flange 184 of the flexible pipe 183. This pressure, however, is also exerted on the connecting rods 186 and 187 thereby substantially reducing the effect of the pressure because it acts to expand the flexible pipes 181 and 183, thereby the pressure, which is a force acting on the blind flange 184, is substantially eliminated by the reaction force of the rods 186 and 187 and the flexible pipes 181 and 183.

Figure 21:
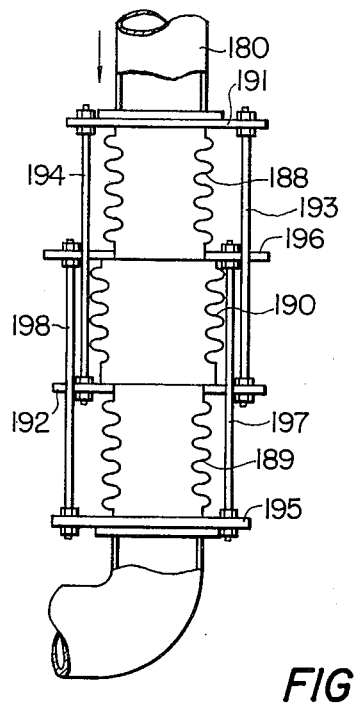
FIG. 21 is a detail view of the embodiment of the device shown in FIG. 20.

Another embodiment of the force effect reducing device according to the present invention is shown FIGS. 20 and 21. A pressure-balancing flexible pipe communicates with and is adjacent to the straight section of the supply pipe 180. As shown in FIG. 21, flexible pipes 188 and 189, having the same diameter, are connected together, and a flexible pipe 190, having an inside diameter $\sqrt{2}$ times that of the flexible pipes 188 and 189 is interposed therebetween. A flange 191 of the flexible pipe 188 is connected to a flange 192 thereby externally joining together the flexible pipes 189 and 190 by means of connecting rods 193 and 194 fastened with nuts. Likewise, the flange 195 of the flexible pipe 189 is connected to a flange 196 thereby externally joining together the flexible pipes 188 and 190 using connecting rods 197 and 198 fastened with nuts. When the pressurized fluid is flowing in the direction of the arrow, the force thereby acting on the flange 196 and the force required to expand the flexible pipe 189 are balanced, the latter being supported by the connecting rods 197 and 198. Likewise, the force acting on the flange 192 balances with the force required to expand the flexible pipe 188, the latter being supported by the connecting rods 193 and 194. Thus the force of the fluid that is exerted on the fluid supply pipe system is effectively eliminated.

Figure 22:
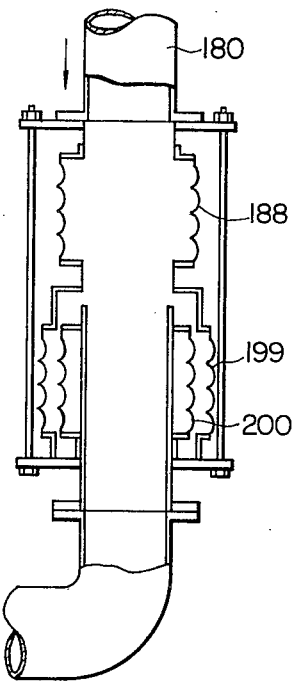
FIG. 22 shows a modification of the device shown in FIG. 21.

FIG. 22 shows a modification of the embodiment shown in FIG. 21, in which a flexible pipe 199 is positioned around the outer periphery of a flexible pipe 200. This arrangement eliminates one set of coupling rods.

As understood from the above, the fluid force effect reducing device is a simple practical unit that can substatially eliminate the bending moment acting on the rotary joint flange.

Figure 23:
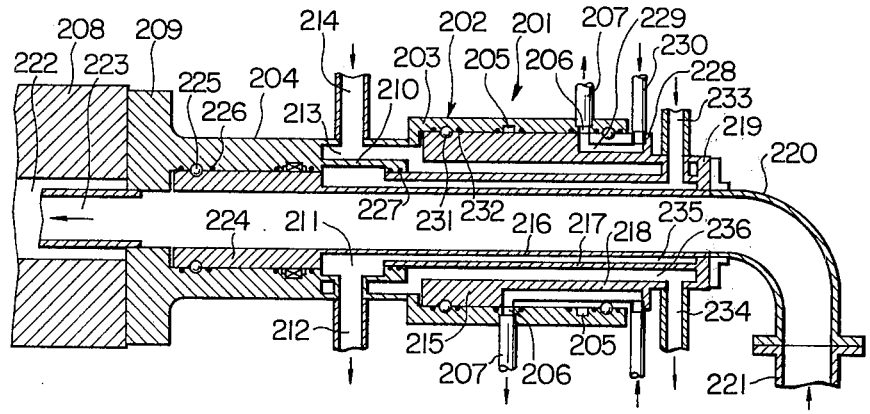
FIG. 23 is a cross-sectional view showing yet another embodiment of the rotary joint constituting the fluid supply apparatus according to this invention.

FIG. 23 shows a still further embodiment of a rotary joint according to the present invention. In this embodiment, pipes and conduits are connected in a fashion that is substantially different from that of the above-described embodiments. Namely, a rotating casing is coupled to a trunnion shaft, and refining gas, protective gas and cooling water supply pipes are connected to a stationary assembly.

A casing 202 of a rotary joint 201 comprises a first cylindrical member 203 and a second cylindrical member 204 having different diameters. In the inner peripheral surface of the first cylindrical member 203 at the far side are provided two axially spaced, circular communication grooves 205. The first cylindrical member 203 has communication ports 206 respectively opening into the individual communication grooves 205. Protective gas conduits 207 are connected to member 203 so as to respectively communicate with the communication grooves 205 through the respective communication ports 206.

The second cylindrical member 204, which has a slightly smaller diameter than the first cylindrical member 203, is connected with bolts etc. to a trunnion shaft 208 at the near end of member 203 and has a cylindrical axial projection 210 which extends outwardly (to the right in the figure) from the inner part of the far end. To this second cylindrical member 204 is attached an entry-side cooling water pipe 212 which communicates with an annular space 211 formed on the radial inside of the projection 210 and an exit-side cooling water pipe 214 which communicates with an annular space 213 formed on radial the outside of the projection 210.

A stationary assembly 215 comprises an inner pipe 216, an outer pipe 217, and an outer cylinder 218, the far ends of which are connected to a body 219.

The inner pipe 216, disposed radially innermost, is conncted to a refining gas supply pipe 221 through an elbow 220 at its far end, and at its near end the pipe 216 communicates with an intermediate pipe 223 placed in a axially extending opening 222 of the trunnion shaft 208. The near end of the inner pipe 216 comprises a sliding part 224 which rotatably fits into the secondary cylindrical member 204. A ball bearing 225 and an O-ring 226 are interposed between the inner peripheral surface of the second cylindrical member 204 and the outer peripheral surface of the sliding part 224.

The near end of the outer pipe 217 rotatably fits into the far end of the projection 210, with an O-ring 227 interposed therebetween.

In the outer cylinder 218 adjacent the radially outwardly extended port 228 there is provided a conduction port 229 which opens into the communication port 205 at its one end and into a pipe 230, at its other end. A protective gas supply pipe 230 is connected to the extended part 228 so as to communicate with the conduction port 229. A ball bearing 231 and an O-ring 232 are interposed between the inner peripheral surface of the first cylindrical member 203 and the outer peripheral surface of the outer cylinder 218.

A cooling water supply pipe 233 a discharge pipe 234 are connected to the body 219 of the stationary assembly 215. The former communicates with the entry-side cooling water pipe 212 by way of an annular space 235 located between the inner pipe 216 and outer pipe 217, while and the latter communicates with the exit-side cooling water pipe 214 by way of an annular space located between the outer pipe 217 and outer cylinder 218.

The rotary joint 201 of this embodiment functions like those of the foregoing embodiments, except that the casing 202 rotates integrally with the trunnion shaft 208 and that the inner pipe 216, outer pipe 217 and outer cylinder 218 remain stationary.

What is claimed is:

1. A fluids supply apparatus for a converter having a plurality of tuyeres at the bottom thereof and supported by a tiltable trunnion ring having an axially projecting trunnion shaft, each tuyere having a refining gas injection nozzle and an annular protective gas injection nozzle coaxially extending around the refining gas injection nozzle, said supplying apparatus comprising:
   a rotary joint having a non-rotatable casing member and a rotary assembly coupled to the trunnion shaft;
   said rotary assembly having a cylindrical member axially extending within said casing member and sealingly and rotatably positioned with respect thereto;
   a refining gas supply conduit having one end connected to the tuyeres for supplying refining gas to the refining gas injection nozzles thereof and having the other end connected to said rotary assembly;
   a plurality of protective gas supply conduits, each having one end respectively connected to one tuyere for supply protective gas to the protective gas injection nozzle thereof and having the other end connected to said rotary assembly;

said rotary assembly having a plurality of passageways, each respectively communicating with one of said protective gas supply conduits;

said members having a groove and port communication means for respectively communicating said passageways with the outside surface of said casing member;

a plurality of protective gas supply pipes, each respectively connected to the outside surface of said casing member and communicating with said groove and port communication means for respectively supplying protective gas to one of said passageways;

a refining gas supply pipe connected to said casing member; and said casing member and said rotary assembly having a channel communication means for communicating said refining gas supply conduit with said refining gas supply pipe.

2. A fluids supply apparatus as claimed in claim 1, wherein said groove and port communication means includes said casing member having ports through the outside surface thereof, each of said ports respectively communicating with one of said passageways and one of said protective gas supply pipes.

3. A fluids supply apparatus as claimed in claim 2, wherein said groove and port communication means further includes said casing member having circumferentially extending grooves in the inner peripheral wall thereof, each of said grooves being axially spaced from one another and communicating one of said passageways with one of said ports.

4. A fluids supply apparatus as claimed in claim 2, wherein said groove and port communication means further includes said cylindrical member having circumferentially extending grooves in the outer peripheral wall thereof, each of said grooves being axially spaced from one another and communicating one of said passageways with one of said ports.

5. A fluids supply apparatus as claimed in claim 2, wherein said groove and port communication means further includes said casing member having at least one circumferentially extending groove in the inner peripheral wall thereof and said cylindrical member having at least one circumferentially extending groove in the outer peripheral wall thereof, each of said grooves being axially spaced from one another and communicating one of said passageways with one of said ports.

6. A fluids supply apparatus as claimed in claim 2, further comprising flow rate control valves, each of said valves being operatively associated with one of said protective gas supply pipes for controlling the flow of fluid therein.

7. A fluids supply apparatus as claimed in claim 2, wherein said channel communication means includes an inner pipe axially extending within said cylindrical member and coaxially disposed with respect thereto.

8. A fluids supply apparatus as claimed in claim 7, further comprising:
the outer diameter of said inner pipe being substantially smaller than the inner diameter of said cylindrical member;
an outer pipe axially extending within said cylindrical member and coaxially disposed with respect thereto and surrounding said inner pipe;
said outer pipe having an annular space therein between the outer peripheral wall of said inner pipe and the inner peripheral wall of said outer pipe.

9. A fluids supply apparatus as claimed in claim 8, wherein said annular space is filled with a sealing gas.

10. A fluids supply apparatus as claimed in claim 8, further comprising a gas detecting means operatively associated with said annular space for detecting the presence of gas therein.

11. A fluids supply apparatus as claimed in claim 7, further comprising:
an electical conduit positioned inside said inner pipe and having a portion thereof projecting from said casing member for housing electrical wires extending to the converter bottom; and
an electrical connector attached to said projecting portion of said electrical conduit.

12. A fluids supply apparatus for a converter having a plurality of tuyeres at the bottom thereof and supported by a tiltable trunnion ring having an axially projecting trunnion shaft, each tuyere having a refining gas injection nozzle and an annular protective gas injection nozzle coaxially extending around the refining gas injection nozzle, said supplying apparatus comprising:
a rotary joint having a rotating casing member coupled to the trunnion shaft and a stationary assembly;
said stationary assembly having a cylindrical member, a portion thereof axially extending within said casing member, said casing member being sealingly and rotatably positioned around said portion of said cylindrical member, one end of said cylindrical member outwardly projecting from said casing member and away from the trunnion shaft;
a refining gas supply conduit having one end connected to the tuyeres for supplying refining gas to the refining gas injection nozzles thereof and having the other end connected to said rotating casing member;
a plurality of protective gas supply conduits, each having one end respectively connected to one tuyere for supplying protective gas to the protective gas injection nozzle thereof and having the other end connected to the outside surface of said rotating casing member;
said rotary casing member having ports through the outside surface thereof, each of said ports respectively communicating with one of said protective gas supply conduits;
a plurality of protective gas supply pipes, each respectively connected to the outside surface of said cylindrical member one end;
said stationary assembly having a plurality of passageways, each respectively communicating with one of said protective gas supply pipes;
said members having a groove communication means for respectively communicating said passageways with said ports;
a refining gas supply pipe connected to said stationary assembly; and
said rotating casing member and said stationary assembly having a channel communication means for communicating said refining gas conduit with said refining gas supply pipe.

13. A fluid supply apparatus as claimed in claim 12, wherein said groove communication means includes said rotating casing member having circumferentially extending grooves in the inner peripheral wall thereof, each of said grooves being axially spaced from one another and communicating one of said passageways with one of said ports.

14. A fluid supply apparatus as claimed in claim 12, wherein said groove communication means includes said cylindrical member portion having circumferentially extending grooves in the outer peripheral wall thereof, each of said grooves being axially spaced from one another and communicating one of said passageways with one of said ports.

15. A fluids supply apparatus as claimed in claim 12, wherein said groove communication means includes said rotating casing member having at least one circumferentially extending groove in the inner peripheral wall thereof and said cylindrical member portion having at least one circumferentially extending groove in the outer peripheral wall thereof, each of said grooves being axially spaced from one another and communicating one of said passageways with one of said ports.

* * * * *